(12) United States Patent
Xiong

(10) Patent No.: US 11,604,472 B2
(45) Date of Patent: Mar. 14, 2023

(54) METHOD FOR CONTROLLING VEHICLE SPEED FOR AUTONOMOUS DRIVING, ELECTRONIC DEVICE, AND COMPUTER-READABLE STORAGE MEDIUM

(71) Applicant: WeRide Corp, Sunnyvale, CA (US)

(72) Inventor: Wu Xiong, Sunnyvale, CA (US)

(73) Assignee: WeRide Corp, Sunnyvale, CA (US)

( * ) Notice: Subject to any disclaimer, the term of this patent is extended or adjusted under 35 U.S.C. 154(b) by 392 days.

(21) Appl. No.: 16/906,528

(22) Filed: Jun. 19, 2020

(65) Prior Publication Data

US 2020/0401154 A1 Dec. 24, 2020

Related U.S. Application Data

(60) Provisional application No. 62/864,558, filed on Jun. 21, 2019.

(51) Int. Cl.
G05D 1/02 (2020.01)

(52) U.S. Cl.
CPC ......... *G05D 1/0223* (2013.01); *G05D 1/0221* (2013.01)

(58) Field of Classification Search
CPC ............... G05D 1/0223; G05D 1/0221; G05D 2201/02; G05D 1/0088; G05D 2201/0213; G05D 1/0278; B60W 2520/10; B60W 2520/105; B60W 30/143; B60W 50/085; B60W 2510/0638; B60W 2720/10; B60W 2556/10
See application file for complete search history.

(56) References Cited

U.S. PATENT DOCUMENTS

| 10,882,530 | B2 * | 1/2021 | Kumazaki | ......... B60W 50/0098 |
| 2020/0103913 | A1 * | 4/2020 | Zhu | ..................... G05B 13/0265 |
| 2020/0192390 | A1 * | 6/2020 | Luo | ........................ B60W 30/18 |
| 2020/0391746 | A1 * | 12/2020 | Parks | ..................... G08G 1/167 |

FOREIGN PATENT DOCUMENTS

WO  WO-2018045650 A1 *  3/2018 ............. B60K 31/00

OTHER PUBLICATIONS

Jun Liu, Vehicle Speed Control Method and Device, Mar. 15, 2018 (Year: 2018).*

* cited by examiner

*Primary Examiner* — Rachid Bendidi
*Assistant Examiner* — Carville Albert Hollingsworth, IV
(74) *Attorney, Agent, or Firm* — George McGuire

(57) ABSTRACT

Disclosed are a method and apparatus for controlling a vehicle speed for autonomous driving, an electronic device and a computer-readable storage medium. The method includes: obtaining a basic vehicle speed control instruction output by a central controller of a target vehicle in real time; generating an ideal speed parameter matching the basic vehicle speed control instruction according to a preset processing delay; generating an additional vehicle speed control instruction to perform vehicle speed control on the target vehicle according to a difference between the ideal speed parameter and a real-time speed parameter of the target vehicle; and returning to perform the operation of generating the ideal speed parameter matching the basic vehicle speed control instruction according to the preset processing delay until the real-time speed parameter of the target vehicle tends to be consistent with the ideal speed parameter.

12 Claims, 3 Drawing Sheets

METHOD FOR CONTROLLING VEHICLE SPEED FOR AUTONOMOUS DRIVING, ELECTRONIC DEVICE, AND COMPUTER-READABLE STORAGE MEDIUM

CROSS-REFERENCE TO RELATED APPLICATIONS

This application claims the benefit of U.S. Provisional Patent Application No. 62/864,558, filed Jun. 21, 2019, which is incorporated by reference herein in its entirety.

TECHNICAL FIELD

Embodiments of the present disclosure generally relates to the technical field of signal control and, in particular, relates to a method and apparatus for controlling a vehicle speed for autonomous driving, as well as a computer-readable storage medium.

BACKGROUND

With autonomous vehicles being increasingly practical, how to accurately and effectively control the driving speed of autonomous vehicles has become a common concern.

In the related art of autonomous driving, pedals (accelerator pedal and brake pedal) of a vehicle are mainly controlled through control instructions sent from an inherent vehicle speed control system integrated into a central controller of the vehicle, thereby achieving the purpose of adjusting the driving speed of the vehicle.

However, various factors will simultaneously affect the driving speed of the autonomous vehicle including the driving environment, vehicle mass, setting changes of internal vehicle sensors, wheel wear degree, and different pedal calibration degrees. Therefore, it is impossible to achieve the purpose of accurately and timely controlling the driving speed of the vehicle only relying on the control instructions sent by the central controller of the vehicle. Because there are slight differences in the internal hardware structure (such as a pedal mechanical installation error) of vehicles of the same model in the production process, in order to ensure the uniformity of vehicle speed control, the pedals of each vehicle must be calibrated before the vehicle leaves the factory, which consumes a large amount of time and labor.

SUMMARY

Embodiments of the present disclosure provide a method for controlling a vehicle speed for autonomous driving, as well as an electronic device and a computer-readable storage medium, so as to accurately and timely control the vehicle speed of an autonomous vehicle, and save the production time and production labor for the autonomous vehicle.

In a first aspect, embodiments of the present disclosure provide a method of controlling a vehicle speed for autonomous driving. The method includes:

obtaining in real time a basic vehicle speed control instruction output by a central controller of a target vehicle;

generating an ideal speed parameter matching the basic vehicle speed control instruction according to a preset processing delay, where the preset processing delay is determined according to historical vehicle speed control empirical parameters of a plurality of vehicles matching the target vehicle;

generating an additional vehicle speed control instruction to perform vehicle speed control on the target vehicle according to a difference between the ideal speed parameter and a real-time speed parameter of the target vehicle; and returning to perform the operation of generating the ideal speed parameter matching the basic vehicle speed control instruction according to the preset processing delay until the real-time speed parameter of the target vehicle tends to be consistent with the ideal speed parameter;

where the basic vehicle speed control instruction and the additional vehicle speed control instruction are configured to control the target vehicle to perform a matched vehicle speed control operation.

In a second aspect, embodiments of the present disclosure further provide an electronic device that includes:

one or more processors; and a memory for storing one or more programs; where the one or more programs, when executed by the one or more processors, cause the one or more processors to perform a method for controlling a vehicle speed for autonomous driving, the method comprising:

obtaining in real time a basic vehicle speed control instruction output by a central controller of a target vehicle;

generating an ideal speed parameter matching the basic vehicle speed control instruction according to a preset processing delay, the preset processing delay being determined according to historical vehicle speed control empirical parameters of a plurality of vehicles matching the target vehicle;

generating an additional vehicle speed control instruction to perform vehicle speed control on the target vehicle according to a difference between the ideal speed parameter and a real-time speed parameter of the target vehicle; and returning to perform the operation of generating the ideal speed parameter matching the basic vehicle speed control instruction according to the preset processing delay until the real-time speed parameter of the target vehicle tends to be consistent with the ideal speed parameter;

wherein the basic vehicle speed control instruction and the additional vehicle speed control instruction are configured to control the target vehicle to perform a matched vehicle speed control operation.

In a third aspect, embodiments of the present disclosure provide a computer-readable storage medium storing one or more computer programs which when executed by a processor is configured for performing a method for controlling a vehicle speed for autonomous driving, the method comprising the following operations:

obtaining a basic vehicle speed control instruction output by a central controller of a target vehicle in real time;

generating an ideal speed parameter matching the basic vehicle speed control instruction according to a preset processing delay, the preset processing delay being determined according to historical vehicle speed control empirical parameters of a plurality of vehicles matching the target vehicle;

generating an additional vehicle speed control instruction to perform vehicle speed control on the target vehicle according to a difference between the ideal speed parameter and a real-time speed parameter of the target vehicle; and returning to perform the operation of generating the ideal speed parameter matching the basic vehicle speed control instruction according to the preset processing delay until the real-time speed parameter of the target vehicle tends to be consistent with the ideal speed parameter;

wherein the basic vehicle speed control instruction and the additional vehicle speed control instruction are configured to control the target vehicle to perform a matched vehicle speed control operation.

Embodiments of the present disclosure provide a method for controlling a vehicle speed for autonomous driving, as well as an electronic device and a computer-readable storage medium. An ideal speed parameter matching the basic vehicle speed control instruction is generated according to a preset processing delay, where the basic vehicle speed control instruction is a control instruction generated by an inherent vehicle speed control system of a target vehicle, and the preset processing delay is a time duration different from the processing delay of the inherent vehicle speed control system. An additional vehicle speed control instruction is generated according to a difference between the ideal speed parameter and a real-time speed parameter of the target vehicle and is configured to perform a vehicle speed control on the target vehicle. By repeatedly performing the above process, the purpose of enabling the real-time speed parameter of the target vehicle to tend to be consistent with the ideal speed parameter can be achieved. The problem of inaccurate vehicle speed control or excessive control duration due to the vulnerability of the inherent speed control system of the autonomous vehicle to various factors in the related art is solved, thereby achieving accurate and timely control of the vehicle speed of the autonomous vehicle. At the same time, the problem that a large amount of time and labor is consumed by the calibration of pedals of each vehicle of the same model before leaving the factory for ensuring the uniformity of the vehicle speed control is also solved, thereby achieving uniform control of the vehicle speed without needing pedal calibration. This saves the production time and production labor for the autonomous vehicle.

BRIEF DESCRIPTION OF DRAWINGS

Embodiments of the present disclosure are illustrated by way of example only and not limitation in the figures of the accompanying drawings in which like references indicate similar elements.

DETAILED DESCRIPTION

Figure 1:
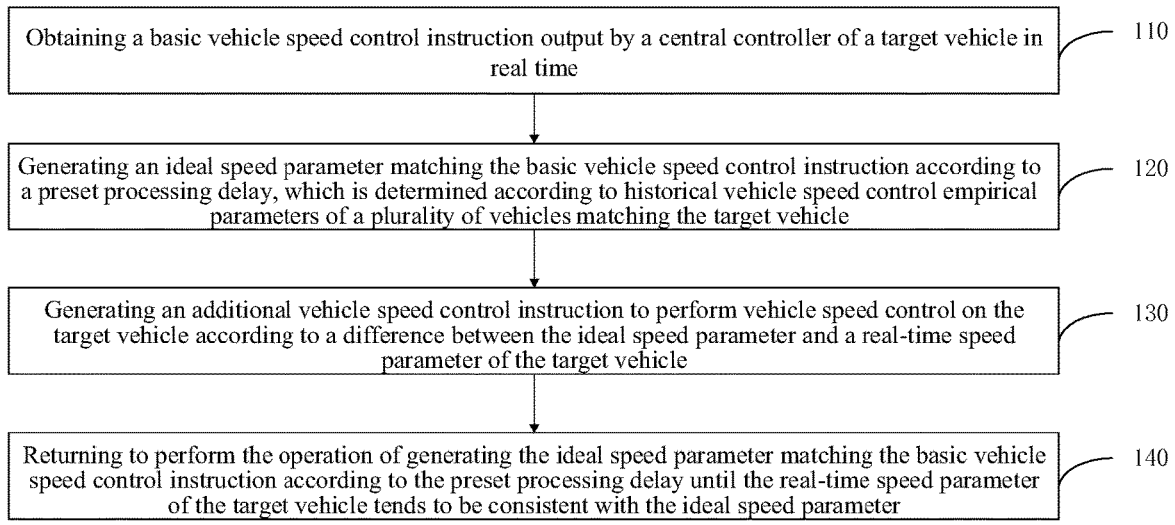
FIG. 1 is a flowchart illustrating a method of controlling a vehicle speed in an autonomous driving mode according to one embodiment of the present disclosure.

Hereinafter the present disclosure will be described in further detail in conjunction with the drawings and embodiments. It is to be understood that the specific embodiments set forth below are merely intended to illustrate rather than limit the present disclosure. It is also to be noted that, for ease of description, only part rather than all of the arrangements related to the present disclosure are illustrated in the drawings.

It is to be further noted that, for ease of description, only part rather than all of contents related to the present disclosure are illustrated in the drawings. Before exemplary embodiments are discussed in more detail, it is to be noted that some of the exemplary embodiments are described as processes or methods depicted in flowcharts. Although the flowcharts describe the operations (steps) as sequential processes, many of the operations may be performed concurrently, coincidentally or simultaneously. Additionally, the sequence of the operations may be rearranged. Each of the processes may be terminated when the operations are completed, but may further have additional steps not included in the drawings. Each of the processes may correspond to one of a method, a function, a procedure, a subroutine, a subprogram, etc.

FIG. 1 is a flowchart illustrating a method of controlling a vehicle speed for autonomous driving according to one embodiment of the present disclosure. This embodiment is applicable to the case of controlling a speed of a vehicle for autonomous. The method may be performed by a vehicle speed control apparatus for autonomous driving provided by the embodiments of the present disclosure. The apparatus may be implemented by software and/or hardware, and may be integrated into a general-purpose electronic device. Typically, the device may be a device that can be adapted to a central controller port of an autonomous vehicle.

In the related art, when a vehicle is driving in the autonomous driving mode, the speed of the vehicle is controlled based on an inherent vehicle speed control system to ensure that the vehicle drives at a desired speed. The inherent vehicle speed control system generally defines a desired acceleration according to a desired speed set in a desired location, a current vehicle speed and a preview distance, and adjusts the pedaling degree of vehicle pedals by the desired acceleration. At the same time, a controller in the inherent vehicle speed control system may also adjust and control the current vehicle speed through a control algorithm to enable the vehicle to reach the set desired speed when driving to the desired location. However, the above-mentioned control algorithm needs to consider the characteristics of each executor inside the vehicle, resulting in a relatively long response delay of the algorithm. Since the vehicle is susceptible to various uncertainties (such as the driving environment, vehicle mass, setting changes of the vehicle internal sensors, wheel wear degree, different pedal calibration degrees, etc.), the resulting control effects are also different. The problems described above lead the existing vehicle speed control method for autonomous driving to fail to accurately and timely control the vehicle speed. In the other hand, in the related art, in order to ensure that the inherent speed control systems of the vehicle of the same model may present unified control effect, it is generally necessary to calibrate or standardize the pedal before the vehicle leaves the factory. That is, the corresponding relationship between the desired acceleration and the pedaling degree of each vehicle is obtained differentially, which inevitably consumes the production time and production labor of the vehicle, and reduces the output efficiency of the vehicle. The method provided by this embodiment controls the current vehicle speed by using a settable processing time that is different from the inherent vehicle control system delay, and unifies the control effect of the vehicle of the same model, thereby avoiding the situation where the vehicle speed may not be accurately and timely controlled when the existing method is used for controlling the vehicle speed, avoiding the problem of the consumption of excess production time and production labor, improving the control frequency within a reasonable range, and saving the production time and the production labor.

As illustrated in FIG. 1, the method in this embodiment includes the following operations which begin with step 110.

In step 110, a basic vehicle speed control instruction output by a central controller of a target vehicle is obtained in real time.

The basic vehicle speed control instruction is configured to control the target vehicle to perform a matched vehicle speed control operation. The basic vehicle speed control instruction is a control instruction obtained in real time through a preset interface and output by the central controller when the target vehicle is in the autonomous mode. That is, it is a control instruction output by the inherent vehicle speed control system of the target vehicle. The basic vehicle speed control instruction may perform the matched vehicle speed control operation on the target vehicle by a certain frequency. The inherent processing frequency is affected by the characteristics of the various executors in the target vehicle, such as the mechanical connections and the executor aging degree. The method then proceeds to step 120.

In step 120, an ideal speed parameter matching the basic vehicle speed control instruction is generated according to a preset processing delay, where the preset processing delay is determined according to historical vehicle speed control empirical parameters of a plurality of vehicles matching the target vehicle.

The preset processing delay refers to a waiting time duration required for generating the ideal speed parameter each time. The preset processing delay corresponds to the time consumed when the basic vehicle speed control instruction passes through an underlying executor of the target vehicle in the inherent vehicle speed control system, that is, the inherent processing delay. Typically, the preset processing delay is set within a reasonable data range and is less than the inherent processing delay consumed when the basic vehicle speed control instruction passes through the underlying executor of the target vehicle.

The plurality of vehicles matching the target vehicle refers to a plurality of vehicles of the same model as the target vehicle. Each of the plurality of vehicles should reflect factors affecting the control effect of the inherent vehicle speed control system on at least one aspect. For example, when the number of the plurality of vehicles is three, and when the main factor affecting the vehicle speed control effect is the driving environment, the vehicle speed control empirical parameter of the vehicle 1 may be acquired when it drives on a wet and slippery road on a rainy day, the vehicle speed control empirical parameter of the vehicle 2 may be acquired when it drives on a snowy icy road, and the vehicle speed control empirical parameters of the vehicle 3 may be acquired when the wind force is level 5.

It is to be noted that the above examples of the plurality of vehicles matching the target vehicle are merely illustrative of the present disclosure. In practice, the number of the plurality of vehicles will not be limited to 3, and the number of factors affecting the vehicle speed control system that needs to be taken into consideration will also not be limited to be one. Typically, it is necessary to consider the influence of various factors on the vehicle speed control, such as the driving environment, vehicle mass, setting changes of the vehicle internal sensors, wheel wear degree, and different pedal calibration degrees, and for each factor, different factor parameters need to be set.

Typically, the historical vehicle speed control empirical parameters are obtained by separately modeling the plurality of vehicles, obtaining the physical models of the plurality of vehicles, and simulating the historical vehicle speed control empirical parameters through the physical models of the plurality of vehicles. The modelling method include, but are not limited to, pattern recognition, neural networks, or support vector machines.

Typically, the method of determining the preset processing delay according to the history vehicle speed control empirical parameters of the plurality of vehicles matching the target vehicle may include determining a preferred vehicle speed control parameter from the historical vehicle speed control empirical parameters of the plurality of vehicles. That is, it is determined that a vehicle of the same model as the target vehicle may reach an optimal processing delay in a current actual data situation, and on the basis of the preferred processing delay, after a certain empirical adjustment, the preset processing delay in this embodiment is determined in a condition that the data is reasonable. For example, time of 20 A-model vehicles consumed when the basic vehicle speed control instruction passes through the underlying executor under influence of different factors is acquired. The optimal processing delay is 1 second, and on the basis of the optimal processing delay, within a reasonable adjustment range, the preset processing delay is defined as 0.9 second.

In this embodiment, the time consumed when a vehicle speed control instruction passes through the executor of the target vehicle is simulated by using the preset processing delay, and the ideal speed parameter matching the basic vehicle speed control instruction is generated according to the basic vehicle speed control instruction. The manner of generating the ideal speed parameter by the basic vehicle speed control instruction may be determined by establishing an ideal speed parameter model, or may be derived according to a theoretical execution formula of each executor in the target vehicle, which however will not be limited herein. The method then progressed to step 130.

In step 130, an additional vehicle speed control instruction to perform vehicle speed control on the target vehicle is generated according to a difference between the ideal speed parameter and a real-time speed parameter of the target vehicle.

In this embodiment, on the basis of acquiring the ideal speed parameter and the real-time speed parameter of the target vehicle, the additional vehicle speed control instruction is acquired by designing a controller. Like the basic vehicle speed control instruction, the additional vehicle speed control instruction is also configured to control the target vehicle to perform the matched vehicle speed control operation. Specifically, the additional vehicle speed control instruction may be overlaid with the basic vehicle speed control instruction to change the actual vehicle speed control instruction applied to the target vehicle. Typically, the designed controller adjusts the vehicle speed of the target vehicle based on proportional-integral-differential (PID) control. The method may then continue to step 140.

In step 140, the method returns to perform the operation of generating the ideal speed parameter matching the basic vehicle speed control instruction according to the preset processing delay until the real-time speed parameter of the target vehicle tends to be consistent with the ideal speed parameter.

In this embodiment, the real-time speed parameter of the target vehicle would tend to be consistent with the ideal speed parameter by continuously generating the additional vehicle speed control instruction based on the preset processing delay, and the overlay function of the additional vehicle speed control instruction and the basic vehicle speed control instruction of the target vehicle.

The preset processing delay in this embodiment is different from the inherent processing delay of the target vehicle, and typically, the preset processing delay is better than the inherent processing delay. Therefore, the vehicle speed control frequency on the target vehicle in this embodiment is high than the processing frequency of the inherent vehicle speed control system. Since the ideal speed parameter is determined based on the historical vehicle speed control empirical parameters of the plurality of vehicles matching the target vehicle, it may be considered as the same standard for the vehicle of the same model, so the technical solution of this embodiment can enable uniform speed control on the vehicle of the same model.

Embodiments of the present disclosure provide a method of controlling a vehicle speed for autonomous driving. The ideal speed parameter matching the basic vehicle speed control instruction is generated according to the preset processing delay, where the basic vehicle speed control instruction is a control instruction generated by the inherent vehicle speed control system of the target vehicle, and the preset processing delay is a time duration which is different from the processing delay of the inherent vehicle speed control system. The additional vehicle speed control instruction is generated according to a difference between the ideal speed parameter and a real-time speed parameter of the target vehicle to perform vehicle speed control on the target vehicle. By repeatedly performing the above-described process, the purpose of getting the real-time speed parameter of the target vehicle to tend to be consistent with the ideal speed parameter can be achieved. The problem of inaccurate vehicle speed control or excessive control time because the inherent speed control system of the autonomous vehicle is susceptible to various factors is solved, achieving accurate and timely control of the vehicle speed of the autonomous vehicle. At the same time, the problem in the related art is solved that a large amount of time and labor is consumed caused by the calibration on pedals of each vehicle of the same model before leaving the factory for ensuring the uniformity of the vehicle speed control, achieving uniform control of the vehicle speed without needing pedal calibration, thereby saving production time and production labor for the autonomous vehicle.

Figure 2:
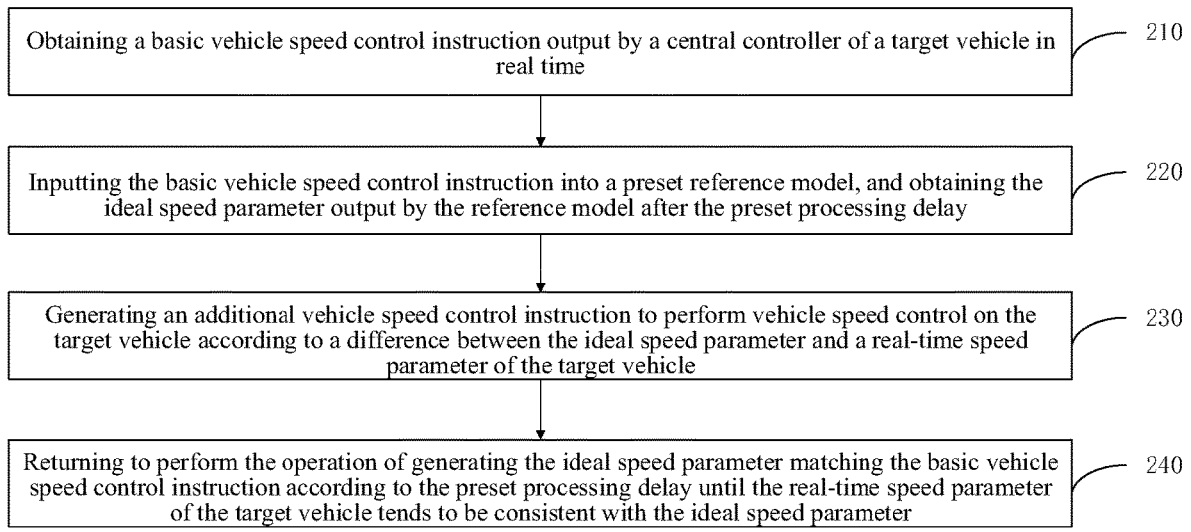
FIG. 2 is a flowchart illustrating a method of controlling a vehicle speed in an autonomous driving mode according to one embodiment of the present disclosure.

FIG. 2 is a flowchart illustrating a method of controlling a vehicle speed for autonomous driving according to one embodiment of the present disclosure. This embodiment may be combined with each optional solution in one or more embodiments described above. In this embodiment, the step of generating the ideal speed parameter matching the basic vehicle speed control instruction according to the preset processing delay may include: inputting the basic vehicle speed control instruction into a preset reference model, and obtaining the ideal speed parameter output by the reference model after the preset processing delay.

Accordingly, the method in this embodiment includes the following operations which may begin with step 210.

In step 210, a basic vehicle speed control instruction output by a central controller of a target vehicle is obtained in real time.

Specifically, the basic vehicle speed control instruction is an acceleration control instruction. The acceleration control instruction is configured to control a pedaling degree of a pedal of the target vehicle. The pedal includes a brake pedal and/or an accelerator pedal.

In the technical solution of this embodiment, the basic vehicle speed control instruction belongs to the acceleration control instruction. Generally, in the related art, a desired acceleration is defined according to a desired speed set by the target vehicle in a desired location, a current vehicle speed of the target vehicle and a preview distance. The inherent controller controls the vehicle speed of the target vehicle to ensure that the vehicle of the target vehicle may reach the desired speed in the desired location. In this control process, the basic vehicle speed control instruction in this embodiment may be generated. Relative to the desired acceleration in the related art, in this embodiment, typically, the basic vehicle speed control instruction is a basic acceleration control instruction.

The acceleration control instruction is associated with the pedaling degree of the pedals of the target vehicle. The pedaling degree refers to an opening degree of the pedal relative to the unpedaled state. Typically, there is a comparison relationship table between the acceleration control instruction and the pedaling degree of the pedal. The specific relationship characteristic is determined by the mechanical characteristic of the target vehicle. That is, the acceleration control instruction finally implements the control on the power apparatus of the target vehicle by controlling the opening degree of the pedal through the mechanical structure, thereby achieving the vehicle speed adjustment. In the technical solution of this embodiment, the pedal may be a brake pedal, or may be an accelerator pedal, or may be the brake pedal and the accelerator pedal. Therefore, overall control on the vehicle speed of the target vehicle may be ensured. The method then proceeds to step 220.

In step 220, the basic vehicle speed control instruction is input to a preset reference model, and the ideal speed parameter output by the reference model after the preset processing delay is obtained.

The reference model is trained or recognized by using ideal brake and/or accelerator data obtained based on brake and/or accelerator data of a plurality of vehicles of a same model as the target vehicle.

Similar to the manner of determining the preset processing delay, the training or recognition data of the reference model is determined through the brake and/or accelerator data of the plurality of vehicles of the same model as the target vehicle. Specifically, the manner of obtaining the ideal brake and/or accelerator data through the brake and/or accelerator data of the plurality of vehicles may include obtaining exemplary brake and/or accelerator data in the brake and/or accelerator data of the plurality of vehicles, and to perform manual empirical adjustment on the basis of the exemplary brake and/or accelerator data to obtain the ideal brake and/or accelerator data.

In this embodiment, the manner of obtaining the reference model by training or recognizing the ideal brake and/or accelerator data includes, but is not limited to, obtaining the reference model through the training of the neural network, or establishing the reference model by recognizing the ideal brake and/or accelerator data through system recognition, and determining the reference model by means of a combination of the neural network and the system recognition.

Optionally, the reference model includes a time delay submodel and a system transition section response submodel which are connected in series.

The time delay submodel is configured to receive the input basic vehicle speed control instruction, and output the processed basic vehicle speed control instruction after the preset processing delay to the system transition section response submodel.

The system transition section response submodel is configured to generate and output the matching ideal speed parameter according to the received basic vehicle speed control instruction.

The function of the time delay submodel is to control the simulation of the preset processing delay by the reference model, that is, to control the reference model to output a main processing frequency of the ideal speed parameter. The system transition section response submodel is applied to simulate a vehicle speed response process after the basic vehicle speed control instruction of the target vehicle is executed, that is, a physical signal change process. Typically, the system transition section response submodel is a first-order response submodel.

This optional technical solution ensures that the ideal speed parameter be generated according to the preset processing delay and the ideal vehicle speed response process by refining the reference model into the time delay submodel and the system transition section response submodel which are connected in series, thereby achieving the purpose of timely and reasonably generating the ideal speed parameter. The method then continues to step 230.

In step 230, an additional vehicle speed control instruction to perform vehicle speed control on the target vehicle is generated according to a difference between the ideal speed parameter and a real-time speed parameter of the target vehicle.

Like the basic vehicle speed control instruction, the additional vehicle speed control instruction is also an acceleration control instruction. Typically, the additional vehicle speed control instruction is an additional acceleration control instruction. In addition, the acceleration control instruction will not be described again herein. The method then proceeds to step 240.

In step 240, the method returns to perform the operation of generating the ideal speed parameter matching the basic vehicle speed control instruction according to the preset processing delay until the real-time speed parameter of the target vehicle tends to be consistent with the ideal speed parameter.

For details that are not explained in this embodiment, reference may be made to the foregoing embodiments, which is not to be repeated herein.

The technical solution of this embodiment is described in detail on the basis of the above embodiments. The technical solution provides a specific step of generating the ideal speed parameter matching the basic vehicle speed control instruction according to the preset processing delay, thereby ensuring that the generation of the ideal speed parameter is based on the actual vehicle data, and ensuring that the ideal speed parameter is better than the actual speed parameter.

Figure 3:
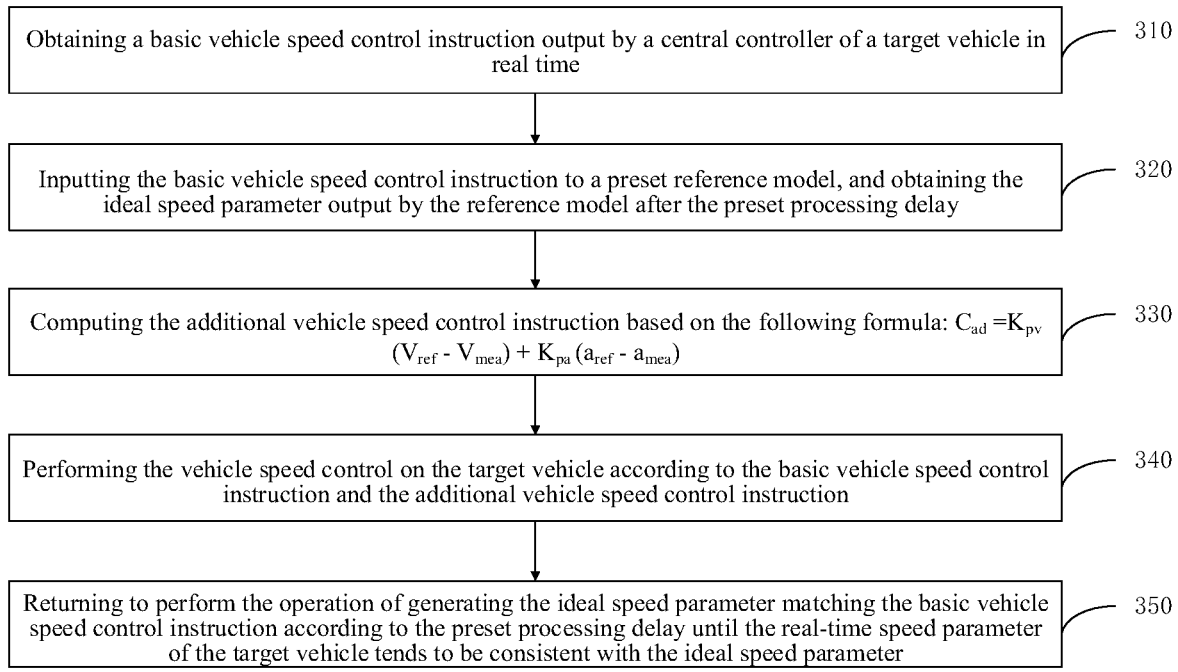
FIG. 3 is a flowchart illustrating a method of controlling a vehicle speed in an autonomous driving mode according to one embodiment of the present disclosure.

FIG. 3 is a flowchart illustrating a method of controlling a vehicle speed for autonomous driving according to one embodiment of the present disclosure. This embodiment may be combined with each optional solution in one or more embodiments described above. In this embodiment, the step of generating the additional vehicle speed control instruction to perform the vehicle speed control on the target vehicle according to the difference between the ideal speed parameter and the real-time speed parameter of the target vehicle may include: computing the additional vehicle speed control instruction based on the following formula: $C_{ad}=K_{pv}(V_{ref}-V_{mea})+K_{pa}(a_{ref}-a_{mea})$, and performing the vehicle speed control on the target vehicle according to the basic vehicle speed control instruction and the additional vehicle speed control instruction.

Accordingly, the method in this embodiment may include the following operations which may begin with step 310.

In step 310, a basic vehicle speed control instruction output by a central controller of a target vehicle is obtained in real time.

In step 320, the basic vehicle speed control instruction is input to a preset reference model, and the ideal speed parameter output by the reference model after the preset processing delay is obtained.

The ideal speed parameter includes an ideal speed and an ideal acceleration. The ideal speed is obtained by integrating the ideal acceleration.

Optionally, after the ideal speed parameter is obtained, a real-time speed and a real-time acceleration of the target vehicle currently detected by a sensor are used as a real-time speed parameter of the target vehicle.

The sensor may be an inherent sensor integrated in the target vehicle, or may be an additional sensor disposed in the target vehicle. When the sensor is an inherent sensor integrated in the target vehicle, an external interface of the inherent sensor needs to be accessed in advance.

In step 330, the additional vehicle speed control instruction is computed based on the following formula: $C_{ad}=K_{pv}(V_{ref}-V_{mea})+K_{pa}(a_{ref}-a_{mea})$.

$C_{ad}$ is the additional vehicle speed control instruction, $K_{pv}$ is a speed proportional coefficient, $V_{ref}$ is the ideal speed in the ideal speed parameter, $V_{mea}$ is the real-time speed in the real-time speed parameter, $K_{pa}$ is an acceleration proportional coefficient, $a_{ref}$ is the ideal acceleration in the ideal speed parameter, and $a_{mea}$ is the real-time acceleration in the real-time speed parameter.

In the technical solution of this embodiment, the additional vehicle speed control instruction is generated by using a proportional controller. $K_{pv}$ is the speed proportional coefficient, $K_{pa}$ is the acceleration proportional coefficient, and these two proportional coefficients are determined through parameter adjustment. Typically, a specific manner of the parameter adjustment may be as follows: determine a general value range of the two proportional coefficients and a general central value of the two proportional coefficients in advance through physical models of the plurality of vehicles matching the target vehicle as well as the reference model. In the target vehicle, the vehicle speed of the target vehicle is controlled by using the general center values of the two proportional coefficients, and the two proportional coefficients are adjusted within the general value range until a preferred vehicle speed control effect is obtained.

Optionally, after the additional vehicle speed control instruction is computed, the method further includes:

performing filtering processing on the additional vehicle speed control instruction to obtain a filtered additional vehicle speed control instruction.

In the technical solution of this embodiment, besides the controller for outputting the additional vehicle speed control instruction, a filter is further set for filtering frequency signals which fail to meet the overlaying rule when the vehicle speed control instructions are overlaid. Typically, the filter is a low pass filter. Therefore, accuracy of the obtained vehicle speed control instruction may be ensured.

In step 340, the vehicle speed control is performed on the target vehicle according to the basic vehicle speed control instruction and the additional vehicle speed control instruction.

Typically, the basic vehicle speed control instruction and the additional vehicle speed control instruction are overlaid to obtain a new vehicle speed control instruction which is performed on the target vehicle, so as to implement the control of the vehicle speed of the target vehicle.

In step 350, the method returns to perform the operation of generating the ideal speed parameter matching the basic vehicle speed control instruction according to the preset processing delay until the real-time speed parameter of the target vehicle tends to be consistent with the ideal speed parameter.

For details that are not explained in this embodiment, reference may be made to the foregoing embodiments, which is not repeated herein.

The technical solution of this embodiment is described in detail on the basis of the above embodiments. The technical solution provides a specific step after the ideal speed parameter matching the basic vehicle speed control instruction is generated according to the preset processing delay. That is, the speed parameter includes the acceleration and the speed, and the vehicle speed is controlled based on the specific acceleration and speed parameter, thereby ensuring that the technical solution of this embodiment accurately controls the vehicle speed of the target vehicle.

Figure 4:
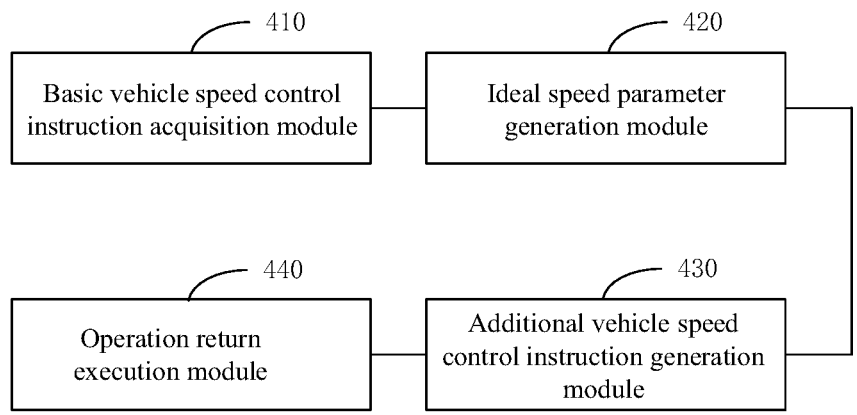
FIG. 4 is a block diagram illustrating an apparatus for controlling a vehicle speed in an autonomous driving mode according to one embodiment of the present disclosure.

FIG. 4 is a block diagram illustrating an apparatus for controlling a vehicle speed for autonomous driving according to one embodiment of the present disclosure. As illustrated in FIG. 4, the apparatus includes a basic vehicle speed control instruction acquisition module 410, an ideal speed parameter generation module 420, an additional vehicle speed control instruction generation module 430 and an operation return execution module 440.

The basic vehicle speed control instruction acquisition module 410 is configured to obtain in real time a basic vehicle speed control instruction output by a central controller of a target vehicle.

The ideal speed parameter generation module 420 is configured to generate an ideal speed parameter matching the basic vehicle speed control instruction according to a preset processing delay, where the preset processing delay is determined according to historical vehicle speed control empirical parameters of a plurality of vehicles matching the target vehicle.

The additional vehicle speed control instruction generation module 430 is configured to generate an additional vehicle speed control instruction to perform vehicle speed control on the target vehicle according to a difference between the ideal speed parameter and a real-time speed parameter of the target vehicle.

The operation return execution module 440 is configured to return to perform the operation of generating the ideal speed parameter matching the basic vehicle speed control instruction according to the preset processing delay until the real-time speed parameter of the target vehicle tends to be consistent with the ideal speed parameter.

The basic vehicle speed control instruction and the additional vehicle speed control instruction are configured to control the target vehicle to execute a matched vehicle speed control operation.

The embodiments of the present disclosure provide an apparatus for controlling a vehicle speed for autonomous driving. The ideal speed parameter matching the basic vehicle speed control instruction is generated according to the preset processing delay, where the basic vehicle speed control instruction is a control instruction generated by the inherent vehicle speed control system of the target vehicle, and the preset processing delay is a time duration which is different from the processing delay of the inherent vehicle speed control system. The additional vehicle speed control instruction is generated according to a difference between the ideal speed parameter and a real-time speed parameter of the target vehicle to perform vehicle speed control on the target vehicle. By repeatedly executing the above-described process, the purpose of enabling the real-time speed parameter of the target vehicle to tend to be consistent with the ideal speed parameter may be achieved. The problem of inaccurate vehicle speed control or excessive control time due to the vulnerability of the inherent speed control system of the autonomous vehicle to various factors is solved, thereby achieving accurate and timely control of the vehicle speed of the autonomous vehicle. At the same time, the problem in the related art that a large amount of time and labor is consumed caused by the calibration on pedals of each vehicle of the same model before leaving the factory for ensuring the uniformity of the vehicle speed control is also solved, achieving uniform control of the vehicle speed without needing pedal calibration, thereby saving production time and production labor of the autonomous vehicle.

On the basis of the embodiments described above, the ideal speed parameter generation module 420 may be specifically configured to:

input the basic vehicle speed control instruction into a preset reference model, and acquire the ideal speed parameter output by the reference model after the preset processing delay.

The basic vehicle speed control instruction and the additional vehicle speed control instruction include an acceleration control instruction, the acceleration control instruction is configured to control a pedaling degree of a pedal of the target vehicle, the pedal includes a brake pedal and/or an accelerator pedal, and the reference model is trained or recognized by using ideal brake and/or accelerator data obtained based on brake and/or accelerator data of a plurality of vehicles of a same model as the target vehicle.

On the basis of the embodiments described above, the reference model may include a time delay submodel and a system transition section response submodel which are connected in series.

The time delay submodel is configured to receive the input basic vehicle speed control instruction, and output the processed basic vehicle speed control instruction after the preset processing delay to the system transition section response submodel.

The system transition section response submodel is configured to generate and output the matched ideal speed parameter according to the received basic vehicle speed control instruction.

On the basis of the embodiments described above, the additional vehicle speed control instruction generation module 430 may include an additional vehicle speed control instruction calculation unit and a vehicle speed control unit.

The additional vehicle speed control instruction calculation unit is configured to calculate the additional vehicle speed control instruction based on the following formula: $C_{ad}=K_{pv}(V_{ref}-V_{mea})K_{pa}(a_{ref}-a_{mea})$, where $C_{ad}$ is the additional vehicle speed control instruction, $K_{pv}$ is a speed proportional coefficient, $V_{ref}$ is an ideal speed in the ideal speed parameter, $V_{mea}$ is a real-time speed in the real-time speed parameter, $K_{pa}$ is an acceleration proportional coefficient, $a_{ref}$ is ideal acceleration in the ideal speed parameter, and $a_{mea}$ is real-time acceleration in the real-time speed parameter.

The vehicle speed control unit is configured to perform the vehicle speed control on the target vehicle according to the basic vehicle speed control instruction and the additional vehicle speed control instruction.

On the basis of the embodiments described above, besides the additional vehicle speed control instruction calculation unit, a filtering processing unit may be included.

The filtering processing unit is configured to perform filtering processing on the additional vehicle speed control instruction to obtain a filtered additional vehicle speed control instruction.

The vehicle speed control apparatus for autonomous driving described above may execute the vehicle speed control method for autonomous driving provided by any embodiment of the present disclosure, and has functional modules and beneficial effects corresponding to the execution method.

Figure 5:
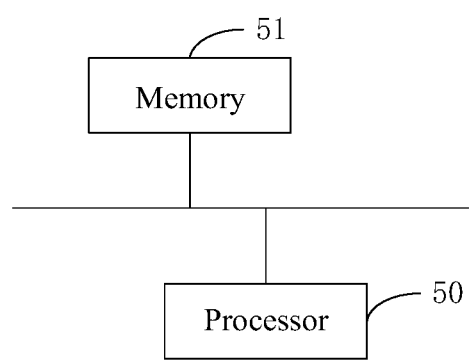
FIG. 5 is a schematic diagram illustrating an electronic device according to one embodiment of the present disclosure.

FIG. 5 is a schematic diagram illustrating an electronic device according to one embodiment of the present disclosure. As illustrated in FIG. 5, the device includes a processor 50 and a memory 51. The number of processors 50 in the device may be one or more, while one processor is taken as an example in FIG. 5. The processor 50 and the memory 51 in the device may be coupled through a bus or in other ways. In FIG. 5, the connection through the bus is used as an example.

The memory 51 functions as a computer-readable storage medium for storing software programs, computer-executable programs and modules, such as program instructions/modules corresponding to the vehicle speed control method for autonomous driving in the embodiments of the present disclosure (such as the basic vehicle speed control instruction acquisition module 410, the ideal speed parameter generation module 420, the additional vehicle speed control instruction generation module 430 and the operation return execution module 440 in the vehicle speed control apparatus for autonomous driving). The processor 50 executes various function applications and data processing of the apparatus, that is, implements the method of controlling a vehicle speed for autonomous driving, by executing software programs, instructions and modules stored in the memory 51.

The memory 51 may mainly include a program storage area and a data storage area. The program storage area may store an operating system and an application program required for implementing at least one function while the data storage area may store data created depending on use of terminals. In addition, the memory 51 may include a high-speed random access memory, and may also include a nonvolatile memory, such as at least one click memory, flash memory or another nonvolatile solid-state memory. In some examples, the memory 51 may further include memories located remotely relative to the processor 50 and these remote memories may be connected to the apparatus via networks. Examples of the preceding network include, but are not limited to, the Internet, an intranet, a local area network, a mobile communication network and a combination thereof.

Embodiments of the present disclosure further provide a storage medium containing computer-executable instructions that, when executed by a computer processor, perform a vehicle speed control method for autonomous driving. The method includes:

obtaining in real time a basic vehicle speed control instruction output by a central controller of a target vehicle;

generating an ideal speed parameter matching the basic vehicle speed control instruction according to a preset processing delay, where the preset processing delay is determined according to historical vehicle speed control empirical parameters of a plurality of vehicles matching the target vehicle;

generating an additional vehicle speed control instruction to perform vehicle speed control on the target vehicle according to a difference between the ideal speed parameter and a real-time speed parameter of the target vehicle; and returning to perform the operation of generating the ideal speed parameter matching the basic vehicle speed control instruction according to the preset processing delay until the real-time speed parameter of the target vehicle tends to be consistent with the ideal speed parameter.

The basic vehicle speed control instruction and the additional vehicle speed control instruction are configured to control the target vehicle to perform a matched vehicle speed control operation.

In the storage medium containing computer-executable instructions provided by embodiments of the present disclosure, the computer-executable instructions implement not only the above method operations but also related operations in the method of controlling a vehicle speed for autonomous driving provided by any embodiment of the present disclosure.

From the above description of embodiments, it will be apparent to those skilled in the art that the present disclosure may be implemented by means of software and necessary general-purpose hardware, or may of course be implemented by hardware, but in many cases the former is a preferred embodiment. Based on this understanding, the technical solutions provided by the present disclosure substantially, or the part contributing to the related art, may be embodied in the form of a software product. The software product is stored in a computer readable storage medium, such as a computer floppy disk, a read-only memory (ROM), a random access memory (RAM), a flash, a hard disk or an optical disk, and includes several instructions for enabling a computer device (which may be a personal computer, a server or a network device) to execute the method according to each embodiment of the present disclosure.

It is to be noted that units and modules involved in the embodiment of the above-mentioned vehicle speed control apparatus for autonomous driving are just divided according to functional logic, and the division is not limited to this, as long as the corresponding functions may be implemented. In addition, the specific names of the each functional unit are just intended for distinguishing, and are not to limit the protection scope of the embodiments of the present disclosure.

It to be noted that the above are only preferred embodiments of the present disclosure and the technical principles used therein. It will be understood by those skilled in the art that the present disclosure is not limited to the specific embodiments described herein. Those skilled in the art can make various apparent modifications, adaptations and substitutions without departing from the scope of the present disclosure. Therefore, while the present disclosure has been described in detail via the above-mentioned embodiments, the present disclosure is not limited to the above-mentioned embodiments and may include more other equivalent embodiments without departing from the concept of the present disclosure. The scope of the present disclosure is determined by the scope of the appended claims.

What is claimed is:

1. A method of controlling a vehicle speed for autonomous driving, comprising:

obtaining a basic vehicle speed control instruction output by a central controller of a target vehicle in real time;

generating an ideal speed parameter matching the basic vehicle speed control instruction according to a preset processing delay, the preset processing delay being determined according to historical vehicle speed control empirical parameters of a plurality of vehicles matching the target vehicle;

generating an additional vehicle speed control instruction to perform vehicle speed control on the target vehicle according to a difference between the ideal speed parameter and a real-time speed parameter of the target vehicle; and returning to perform the operation of generating the ideal speed parameter matching the basic vehicle speed control instruction according to the preset processing delay until the real-time speed parameter of the target vehicle tends to be consistent with the ideal speed parameter;

wherein the basic vehicle speed control instruction and the additional vehicle speed control instruction are configured to control the target vehicle to perform a matched vehicle speed control operation, wherein the ideal speed parameter comprises an ideal speed and an ideal acceleration, the real-time speed parameter comprises a real-time speed and a real-time acceleration, wherein generating the additional vehicle speed control instruction to perform the vehicle speed control on the target vehicle according to the difference between the ideal speed parameter and the real-time speed parameter of the target vehicle comprises:

computing the additional vehicle speed control instruction based on the following formula: $C_{ad}=K_{pv}(V_{ref}-V_{mea})+K_{pa}(a_{ref}-a_{mea})$, where $C_{ad}$ is the additional vehicle speed control instruction, $K_{pv}$ is a speed proportional coefficient, $V_{ref}$ is the ideal speed in the ideal speed parameter, $V_{mea}$ is the real-time speed in the real-time speed parameter, $K_{pa}$ is an acceleration proportional coefficient, $a_{ref}$ is the ideal acceleration in the ideal speed parameter, and $a_{mea}$ is the real-time acceleration in the real-time speed parameter; and performing the vehicle speed control on the target vehicle according to the basic vehicle speed control instruction and the additional vehicle speed control instruction.

2. The method of claim 1, wherein generating the ideal speed parameter matching the basic vehicle speed control instruction according to the preset processing delay comprises:

inputting the basic vehicle speed control instruction to a preset reference model, and obtaining the ideal speed parameter output by the reference model after the preset processing delay;

wherein the reference model is trained or recognized by using ideal brake and/or accelerator data obtained based on brake and/or accelerator data of a plurality of vehicles of a same model as the target vehicle.

3. The method of claim 2, wherein the reference model comprises a time delay submodel and a system transition section response submodel which are connected in series, wherein the time delay submodel is configured to receive the input basic vehicle speed control instruction, and output the processed basic vehicle speed control instruction after the preset processing delay to the system transition section response submodel; and the system transition section response submodel is configured to generate and output the matching ideal speed parameter according to the received basic vehicle speed control instruction.

4. The method of claim 1, further comprising the following operation after computing the additional vehicle speed control instruction:

performing filtering processing on the additional vehicle speed control instruction to obtain a filtered additional vehicle speed control instruction.

5. An electronic device, comprising:

one or more processors; and a memory for storing one or more programs, wherein the one or more programs when executed by the one or more processors cause the one or more processors to perform a method of controlling a vehicle speed for autonomous driving, the method comprising:

obtaining in real time a basic vehicle speed control instruction output by a central controller of a target vehicle;

generating an ideal speed parameter matching the basic vehicle speed control instruction according to a preset processing delay, the preset processing delay being determined according to historical vehicle speed control empirical parameters of a plurality of vehicles matching the target vehicle;

generating an additional vehicle speed control instruction to perform vehicle speed control on the target vehicle according to a difference between the ideal speed parameter and a real-time speed parameter of the target vehicle; and returning to perform the operation of generating the ideal speed parameter matching the basic vehicle speed control instruction according to the preset processing delay until the real-time speed parameter of the target vehicle tends to be consistent with the ideal speed parameter;

wherein the basic vehicle speed control instruction and the additional vehicle speed control instruction are configured to control the target vehicle to perform a matched vehicle speed control operation, wherein the ideal speed parameter comprises an ideal speed and an ideal acceleration, the real-time speed parameter comprises a real-time speed and a real-time acceleration, wherein generating the additional vehicle speed control instruction to perform the vehicle speed control on the target vehicle according to the difference between the ideal speed parameter and the real-time speed parameter of the target vehicle comprises:

computing the additional vehicle speed control instruction based on the following formula: $C_{ad}=K_{pv}(V_{ref}-V_{mea})+K_{pa}(a_{ref}-a_{mea})$, where $C_{ad}$ is the additional vehicle speed control instruction, $K_{pv}$ is a speed proportional coefficient, $V_{ref}$ is the ideal speed in the ideal speed parameter, $V_{mea}$ is the real-time speed in the real-time speed parameter, $K_{pa}$ is an acceleration proportional coefficient, $a_{ref}$ is the ideal acceleration in the ideal speed parameter, and $a_{mea}$ is the real-time acceleration in the real-time speed parameter; and performing the vehicle speed control on the target vehicle according to the basic vehicle speed control instruction and the additional vehicle speed control instruction.

6. The electronic device of claim 5, wherein generating the ideal speed parameter matching the basic vehicle speed control instruction according to the preset processing delay comprises:

inputting the basic vehicle speed control instruction to a preset reference model, and obtaining the ideal speed parameter output by the reference model after the preset processing delay;

wherein the reference model is trained or recognized by using ideal brake and/or accelerator data obtained based on brake and/or accelerator data of a plurality of vehicles of a same model as the target vehicle.

7. The electronic device of claim 6, wherein the reference model comprises a time delay submodel and a system transition section response submodel which are connected in series, wherein the time delay submodel is configured to receive the input basic vehicle speed control instruction, and output the processed basic vehicle speed control instruction after the preset processing delay to the system transition section response submodel; and the system transition section response submodel is configured to generate and output the matching ideal speed parameter according to the received basic vehicle speed control instruction.

8. The electronic device of claim 5, wherein the method further comprises the following operation after computing the additional vehicle speed control instruction:

performing filtering processing on the additional vehicle speed control instruction to obtain a filtered additional vehicle speed control instruction.

9. A computer-readable storage medium storing one or more computer programs, the one or more computer programs when executed on a processor being configured for performing a method for controlling a vehicle speed for autonomous driving, the method comprising the following operations:

obtaining a basic vehicle speed control instruction output by a central controller of a target vehicle in real time;

generating an ideal speed parameter matching the basic vehicle speed control instruction according to a preset processing delay, the preset processing delay being determined according to historical vehicle speed control empirical parameters of a plurality of vehicles matching the target vehicle;

generating an additional vehicle speed control instruction to perform vehicle speed control on the target vehicle according to a difference between the ideal speed parameter and a real-time speed parameter of the target vehicle; and returning to perform the operation of generating the ideal speed parameter matching the basic vehicle speed control instruction according to the preset processing delay until the real-time speed parameter of the target vehicle tends to be consistent with the ideal speed parameter;

wherein the basic vehicle speed control instruction and the additional vehicle speed control instruction are configured to control the target vehicle to perform a matched vehicle speed control operation, wherein the ideal speed parameter comprises an ideal speed and an ideal acceleration, the real-time speed parameter comprises a real-time speed and a real-time acceleration, wherein generating the additional vehicle speed control instruction to perform the vehicle speed control on the target vehicle according to the difference between the ideal speed parameter and the real-time speed parameter of the target vehicle comprises:

computing the additional vehicle speed control instruction based on the following formula: $C_{ad}=K_{pv}(V_{ref}-V_{mea})+K_{pa}(a_{ref}-a_{mea})$, where $C_{ad}$ is the additional vehicle speed control instruction, $K_{pv}$ is a speed proportional coefficient, $V_{ref}$ is the ideal speed in the ideal speed parameter, $V_{mea}$ is the real-time speed in the real-time speed parameter, $K_{pa}$ is an acceleration proportional coefficient, $a_{ref}$ is the ideal acceleration in the ideal speed parameter, and $a_{mea}$ is the real-time acceleration in the real-time speed parameter; and performing the vehicle speed control on the target vehicle according to the basic vehicle speed control instruction and the additional vehicle speed control instruction.

10. The computer-readable storage medium of claim 9, wherein generating the ideal speed parameter matching the basic vehicle speed control instruction according to the preset processing delay comprises:

inputting the basic vehicle speed control instruction to a preset reference model, and obtaining the ideal speed parameter output by the reference model after the preset processing delay;

wherein the reference model is trained or recognized by using ideal brake and/or accelerator data obtained based on brake and/or accelerator data of a plurality of vehicles of a same model as the target vehicle.

11. The computer-readable storage medium of claim 10, wherein the reference model comprises a time delay submodel and a system transition section response submodel which are connected in series, wherein the time delay submodel is configured to receive the input basic vehicle speed control instruction, and output the processed basic vehicle speed control instruction after the preset processing delay to the system transition section response submodel; and the system transition section response submodel is configured to generate and output the matching ideal speed parameter according to the received basic vehicle speed control instruction.

12. The computer-readable storage medium of claim 9, wherein the one or more computer programs when executed on the processer further performs the following operation after computing the additional vehicle speed control instruction:

performing filtering processing on the additional vehicle speed control instruction to obtain a filtered additional vehicle speed control instruction.

* * * * *